US012705371B2

(12) United States Patent
Burkett et al.

(10) Patent No.: US 12,705,371 B2

(45) Date of Patent: Aug. 11, 2026

(54) SYSTEMS FOR TIME DEPENDENT DATA ACCESS AUTHORIZATION

(71) Applicant: BANK OF AMERICA CORPORATION, Charlotte, NC (US)

(72) Inventors: Gregory Allen Burkett, Mooresville, NC (US); Brady Prentice Merkel, Jacksonville Beach, FL (US); David E. Strommer, St. Johns, FL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 693 days.

(21) Appl. No.: 17/980,776

(22) Filed: Nov. 4, 2022

(65) Prior Publication Data

US 2024/0152633 A1 May 9, 2024

(51) Int. Cl.
*G06F 21/60* (2013.01)
*G06F 21/62* (2013.01)

(52) U.S. Cl.
CPC ........ *G06F 21/604* (2013.01); *G06F 21/6218* (2013.01); *G06F 2221/2115* (2013.01); *G06F 2221/2137* (2013.01)

(58) Field of Classification Search
CPC ............... G06F 21/604; G06F 21/6218; G06F 2221/2115; G06F 2221/2137
See application file for complete search history.

(56) References Cited

U.S. PATENT DOCUMENTS

| | | | |
|---|---|---|---|
| 8,151,323 B2 | 4/2012 | Harris et al. | |
| 8,914,410 B2 | 12/2014 | Hannel et al. | |
| 8,943,313 B2 | 1/2015 | Glew et al. | |
| 9,853,959 B1 | 12/2017 | Kapczynski et al. | |
| 9,904,797 B2 | 2/2018 | Oliver et al. | |
| 9,923,918 B2 | 3/2018 | Nicodemus et al. | |
| 10,454,970 B2 | 10/2019 | Anton et al. | |
| 10,726,148 B2 * | 7/2020 | Hughes | G06F 21/6245 |
| 11,265,324 B2 | 3/2022 | Galvez et al. | |
| 11,271,754 B2 | 3/2022 | Peng | |
| 11,310,051 B2 | 4/2022 | Wei et al. | |
| 11,341,271 B2 | 5/2022 | Chen et al. | |
| 11,457,079 B1 | 9/2022 | Mehta et al. | |
| 11,789,911 B1 * | 10/2023 | Surabhi | G06F 16/256 707/802 |
| 2008/0256458 A1 * | 10/2008 | Aldred | G06F 21/6218 715/752 |

(Continued)

*Primary Examiner* — Rupal Dharia
*Assistant Examiner* — Devin E Almeida
(74) *Attorney, Agent, or Firm* — Moore & Van Allen PLLC; Nicholas C. Russell

(57) ABSTRACT

Point-in-Time data access authorization is realized by a data access broker and data access security manager that provide for a data owner/authorizer to provide access consent at the point in time at which a specific data access request is made, without the need for the data owner to share their service-specific access credentials with the third-party entity/data requester. As a result, the data owner has control over the authorization of each data access request and has knowledge as to when the third-party entity is accessing the data. Further, by not having to share access credentials with the third-party entity/data requester security issues related to exposure and/or misuse of the access credentials are avoided.

17 Claims, 5 Drawing Sheets

(56) References Cited

U.S. PATENT DOCUMENTS

2010/0011416 A1* 1/2010 Wagner .................. G06F 21/31
726/4
2011/0314555 A1* 12/2011 Horvitz ................. G06Q 10/10
726/27
2013/0340093 A1* 12/2013 Reinertsen ............. G06F 21/34
726/28
2017/0124645 A1 5/2017 Kortina et al.
2018/0300471 A1* 10/2018 Jain ...................... H04L 63/105
2020/0134217 A1* 4/2020 Vishnyakov ........ G06F 16/2456
2021/0234869 A1 7/2021 Bondugula et al.
2023/0153449 A1* 5/2023 Li ...................... G06F 21/6218
726/4

* cited by examiner

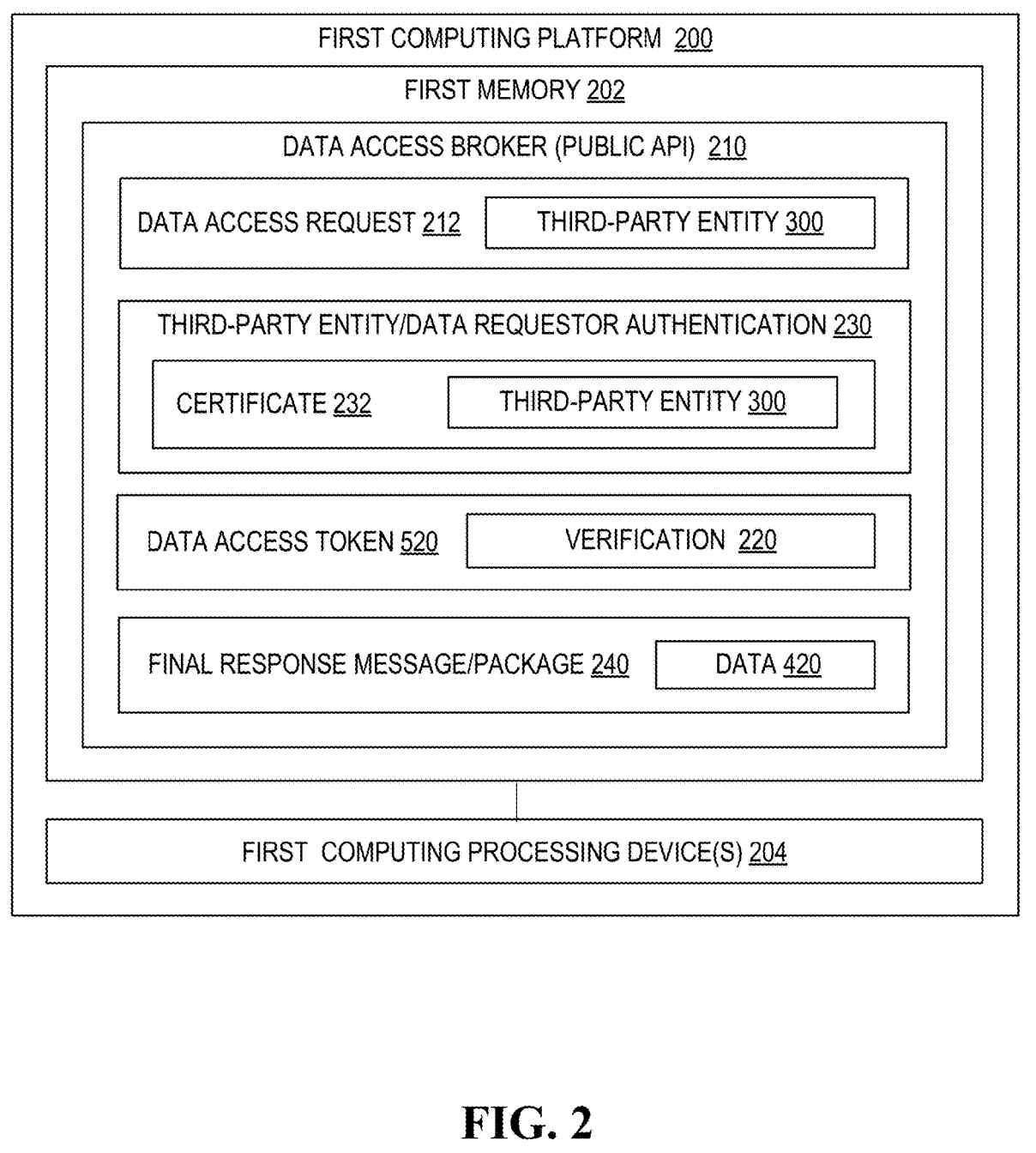

FIRST COMPUTING PLATFORM 200
FIRST MEMORY 202
DATA ACCESS BROKER (PUBLIC API) 210
DATA ACCESS REQUEST 212
THIRD-PARTY ENTITY 300
THIRD-PARTY ENTITY/DATA REQUESTOR AUTHENTICATION 230
CERTIFICATE 232
THIRD-PARTY ENTITY 300
DATA ACCESS TOKEN 520
VERIFICATION 220
FINAL RESPONSE MESSAGE/PACKAGE 240
DATA 420
FIRST COMPUTING PROCESSING DEVICE(S) 204

FIG. 2

SYSTEMS FOR TIME DEPENDENT DATA ACCESS AUTHORIZATION

FIELD OF THE INVENTION

The present invention is related to data access and, more specifically, providing third-party data requesters access to data based on point-in-time authorization by the data authorizer/owner.

BACKGROUND

Typically, when a data owner, referred to herein as a data authorizer, desires to grant a data requestor/entity access to data that is held at a data provider, the data owner is required to provide their data provider-specific user credentials (e.g., username and passcode or the like) to the data requestor so that the data requestor has the ability to access the data provider. However, such a sharing of user credentials poses numerous security issues. First, once user credentials have been shared the potential for misuse rises. In the event that the data requestor/entity experiences a data breach or the like, the proliferation of the user credentials may result in unauthorized data access by nefarious entities. Furthermore, once user credentials have been shared with a data requestor/entity, the data owner has minimal and, in some instance, no control over when the data requestor/entity accesses the data, how often the data requestor/entity accesses the data and/or the type of access that the data requestor/entity performs (i.e., retrieving the data versus viewing the data and the like)

Therefore, a need exists to develop systems, methods and the like that provide a data owner secure control access to their data by other parties/entities. In this regard, a need exists to develop systems, methods and the like that allow for point-in time and pre-request authorization, whereby the data owner grants data requestors authorization to access their data in response to an access request. Moreover, a need further exists to ensure that the authorization granted by the data owner is not only limited to a specific data access request but also defines the parameters for the authorization in terms of what data can be accessed, the duration of the access, the volume and/or type of data to be accessed and the like.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for point-in-time data access authorization. The data owner/authorizer provides authorization at the point in time at which a specific data access request is made, without the need for the data owner to share their service-specific access credentials with the third-party entity/data requester. As a result, the data owner has control over the authorization of each data access request and has knowledge as to when the third-party entity/data requester is accessing the data.

Specifically, systems, methods and the like implement a data access broker which is a public Application Programming Interface (API) that receives data requests from third-party entities (i.e., data requestors) requesting access to a data authorizer's (i.e., data owner) data which is stored/held by a data provider. Typically, the requests made by the third-party entities are at the behest of the data authorizer/owner. The data access broker is responsible for verifying the identity of the third-party entity utilizing Secure Socket Layer (SSL) certificates or the like.

Systems, methods and the like additionally include a data access security manager, which is customized API code or the like. In response to the data access broker verifying the identity of the third-party entity, the data access security manager receives the data request from the data access broker. Data access security manager is responsible for obtaining point-in-time data access authorization from the data owner. In this regard, according to specific embodiments, the data access security manager identifies the data owner's chosen means for data access approval communication (e.g., text/SMS, mobile application or the like) and, in response, communicates a data access authorization request to the data owner that identifies the third-party entity and details of the request (e.g., data being requested including type, volume and/or service/source).

In response to the data owner approving the data access authorization, a response is communicated to the data access security manager, which, in response generates a data access token, which serves as the cryptographic signature for data access and includes a lifespan (i.e., time-to-live) value and a unique signature value which is tied to the data system at the data provider housing the data. Once generated, the data access token is communicated to the data access broker for token approval and once approved, the data access broker forwards the data access token to the data providing service/system at the data provider. The data provider validates the data access token with the data access security manager, and once validated, the data provider retrieves the requested data and provides the data to the data access broker, which subsequently forwards the data to the third-party entity/data requestor.

A system for point-in-time data access authorization defines first embodiments of the invention. The system includes a first computing platform having a first memory and one or more first computing processor devices in communication with the first memory. The first memory stores a data access broker that is executable by at least one of the one or more first computing processor devices. The data access broker is configured to receive a data access request from an entity requesting access to data and forward the data access request to a data access security manager. The data is accessible from a service of a data provider and access to the data is controlled by a data authorizer.

The system additionally includes a second computing platform having a second memory and one or more second computing processor devices in communication with the second memory. The second memory stores the data access security manager that is executable by at least one of the one or more first computing processor devices. The data access security manager is configured to, in response to receiving the data access request, generate and communicate, to the data authorizer, a data access authorization request that identifies the entity and the data. In response to communicating the request, the data access security manager is further configured to receive a response to the data access authorization request from the data authorizer that authorizes the entity to access the data, and, in response, generate and communicate, to the data access broker, a data access token that includes (i) a lifespan value that indicates a time period during which the data is accessible at the data provider and (ii) a signature value that indicates at least the data and the service.

In response to receiving the data access token, the data access broker is further configured to verify an authenticity of the data access token, and, in response, communicate the data access token to the service of the data provider. Once the data provider receives the data access token, the data is retrieved and communication of the data to the requesting entity is initiated.

In specific embodiments of the system, the data access security manager is further configured to identify a communication channel (e.g., text/SMS, mobile application or the like) preselected by the data authorizer and communicate, over the identified communication channel to the data authorizer, the data access authorization request.

In other specific embodiments of the system, the data access security manager is further configured to, in response to the service of the data provider receiving the data access token, receive a data access token validation request from the data provider, and validate the data access token by determining that the data access token was generated by the data access security manager. In response to validation, the data access security manager is further configured to generate and communicate a response, to the validation data access token validation request, that indicates that the data access token is valid.

In still further specific embodiments of the system, the data access security manager is further configured to generate the data access token that includes the signature value, which further indicates at least one of (i) a volume of the data that is accessible to the entity and (ii) a type of the data that is accessible to the entity.

In other specific embodiments of the system, the data access broker is further configured to, in response to the service of the data provider receiving the data access token and collecting the data, receive, from the data provider, the requested data and forward the requested data to the entity.

Moreover, in additional specific embodiments of the system, the data access broker is further configured to, in response to receiving the data access request, verify an identity of the entity (e.g., check for a valid certificate) prior to forwarding the data access request to the data access security manager.

According to specific embodiments of the system, the entity is provided access to the data without the data authorizer providing, to the entity and/or in the response to the data access authorization request, service access credentials associated with the data authorizer.

A computer-implemented method for point-in-time data access authorization defines second embodiments of the invention. The method is executed by one or more computing processor devices. The computer-implemented method includes receiving a data access request from an entity requesting access to data. The data is accessible from a service of a data provider and access to the data is controlled by a data authorizer. In response to receiving the data access request, the computer-implemented method further includes generating and communicating, to the data authorizer, a data access authorization request. The data access authorization request identifies the entity and the data. The computer-implemented method further including receiving a response to the data access authorization request from the data authorizer that authorizes the entity to access the data and, in response, generating a data access token that includes a lifespan value that indicates a time period during which the data is accessible at the data provider and a signature value that indicates at least the data and the service. In addition, the computer-implemented method includes verifying an authenticity of the data access toke and, in response, communicating the data access token to the service of the data provider. In response to the service receiving the data access token, the service retrieves the data and initiates communication of the data to the entity.

In specific embodiments the computer-implemented method further includes identifying a communication channel preselected by the data authorizer. In such embodiments of the computer-implemented method, communicating the data access authorization request further includes communicating, over the identified communication channel to the data authorizer, the data access authorization request.

In further specific embodiments the computer-implemented method further includes, in response to the service receiving the data access token, validating the data access token by determining that the data access token was generated by the data access security manager.

In still further specific embodiments of the computer-implemented method, generating the data access token further includes generating the data access token that includes the signature value, wherein the signature value further indicates at least one of (i) a volume of the data that is accessible to the entity and (ii) a type of the data that is accessible to the entity.

Moreover, in other specific embodiments the computer-implemented method further includes, in response to receiving the data access request, verify an identity of the entity prior to generating and communicating the data access authorization request.

A computer program product including a non-transitory computer-readable medium defines third embodiments of the invention. The computer-readable medium includes sets of codes. The sets of codes cause one or more computing processing devices to receive a data access request from an entity requesting access to data. The data is accessible from a service of a data provider and access to the data is controlled by a data authorizer. In response to receiving the data access request, the sets of codes further cause the computing processor device(s) to generate and communicate, to the data authorizer, a data access authorization request that identifies the entity and the data. In response to receiving a response to the data access authorization request from the data authorizer that authorizes the entity to access the data, the sets of codes further cause the computing processing device(s) to generate a data access token that includes (i) a lifespan value that indicates a time period during which the data is accessible at the data provider and (ii) a signature value that indicates at least the data and the service. Moreover, the sets of codes further cause the computing processing device(s) to verify an authenticity of the data access token, and, in response, communicate the data access token to the service of the data provider. In response to the service receiving the data access token, the service retrieves the data and initiates communication of the data to the entity.

In specific embodiments of the computer program product, the sets of codes further include a set of codes for causing the one or more computing processor devices to identify a communication channel preselected by the data authorizer. In such embodiments of the computer program product, the set of codes for causing the one or more computing processor devices to communicate the data access authorization request further cause the one or more computing processor devices to communicate, over the identified communication channel to the data authorizer, the data access authorization request.

In other specific embodiments of the computer program product, the sets of codes further include a set of codes for causing the one or more computing processor devices to, in response to the service receiving the data access token, validate the data access token by determining that the data access token was generated by the data access security manager.

In still further specific embodiments of the computer program product, the set of codes for causing the one or more computing processor devices to generate the data access token further cause the one or more computing processor device to generate the data access token that includes the signature value, wherein the signature value further indicates at least one of (i) a volume of the data that is accessible to the entity and (ii) a type of the data that is accessible to the entity.

In other specific embodiments of the computer program product, the sets of codes further comprise a set of codes for causing the one or more computing processor devices to, in response to receiving the data access request, verify an identity of the entity prior to generating and communicating the data access authorization request.

Thus, according to embodiments of the invention, which will be discussed in greater detail below, the present invention provides for point-in-time data access authorization. The data owner/authorizer provides authorization at the point in time at which a specific data access request is made, without the need for the data owner to share their service-specific access credentials with the third-party entity/data requester. As a result, the data owner has control over the authorization of each data access request and has knowledge as to when data access by the third-party entity is occurring. Further, by not having to share access credentials with the third-party entity/data requester security issues related to exposure and/or misuse of the access credentials are avoided.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
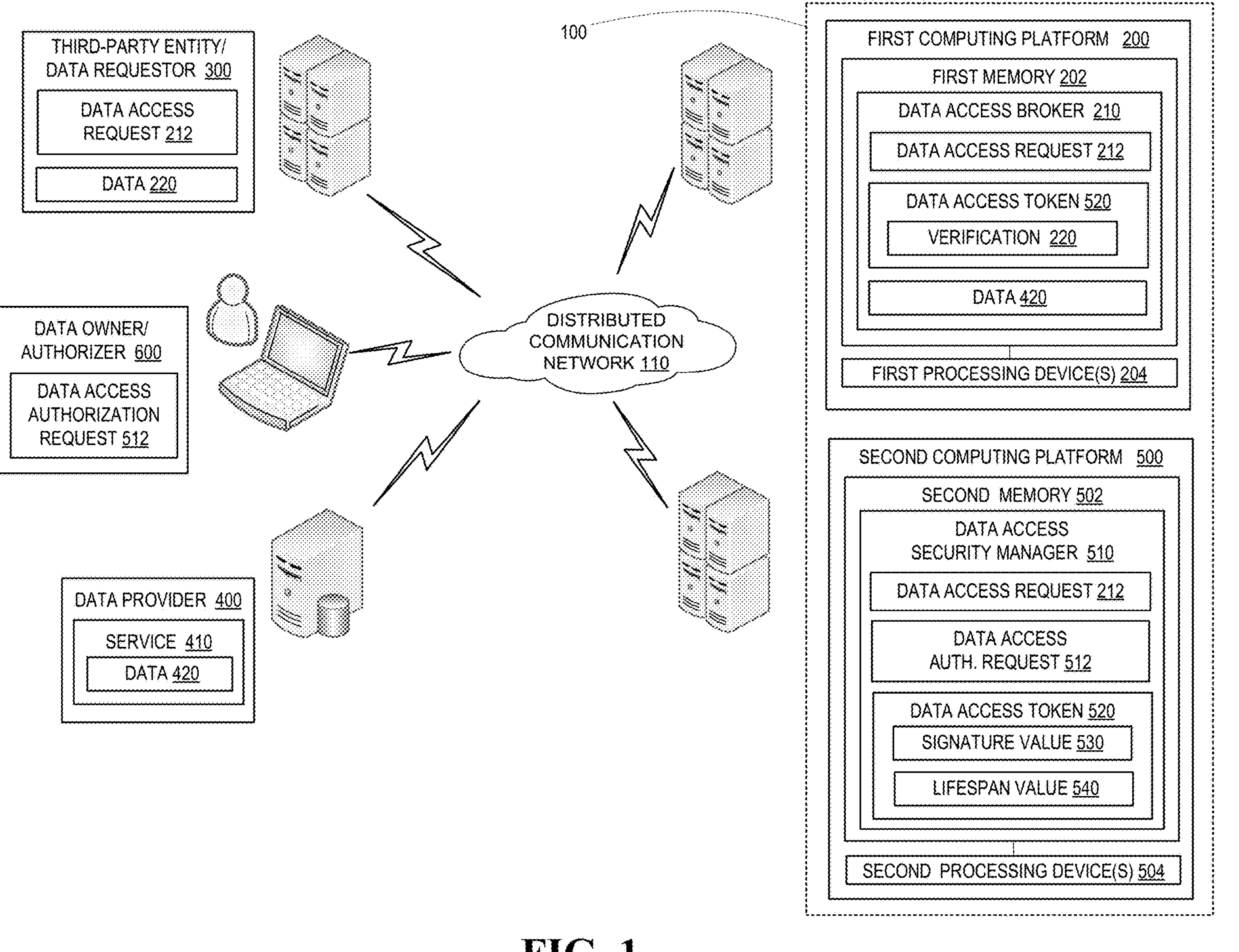
Figure 3:
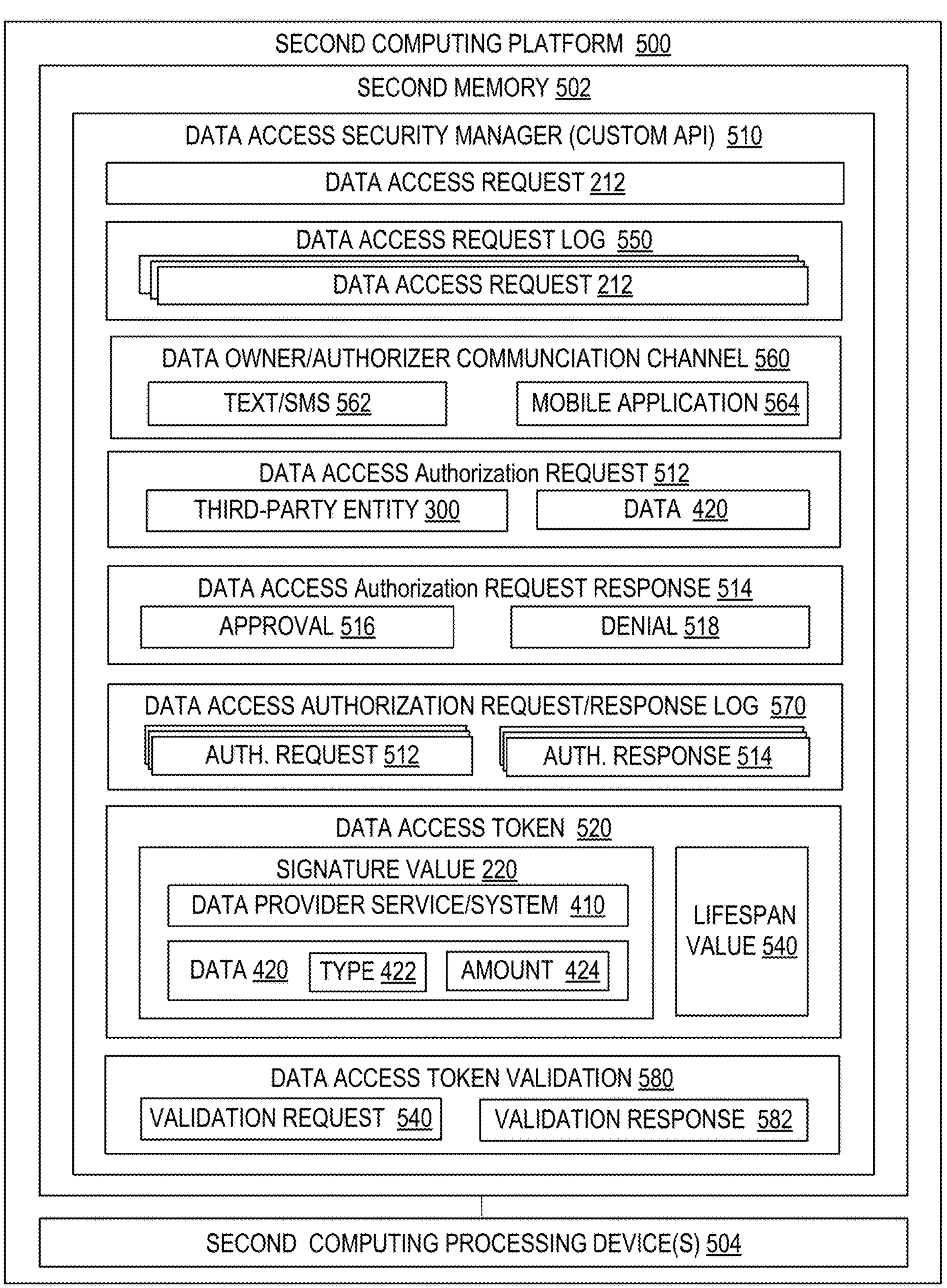
Figure 4:
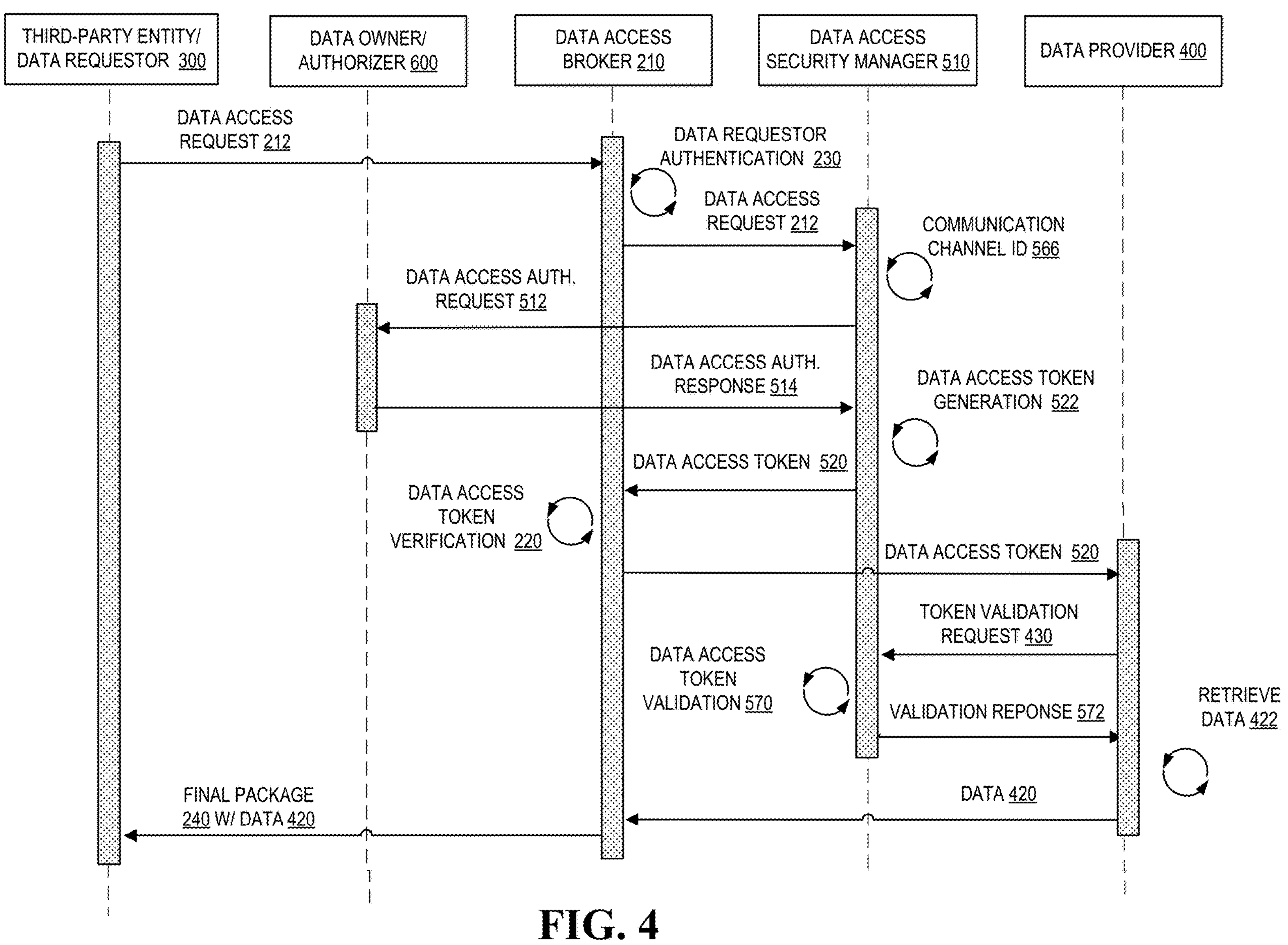
Figure 5:
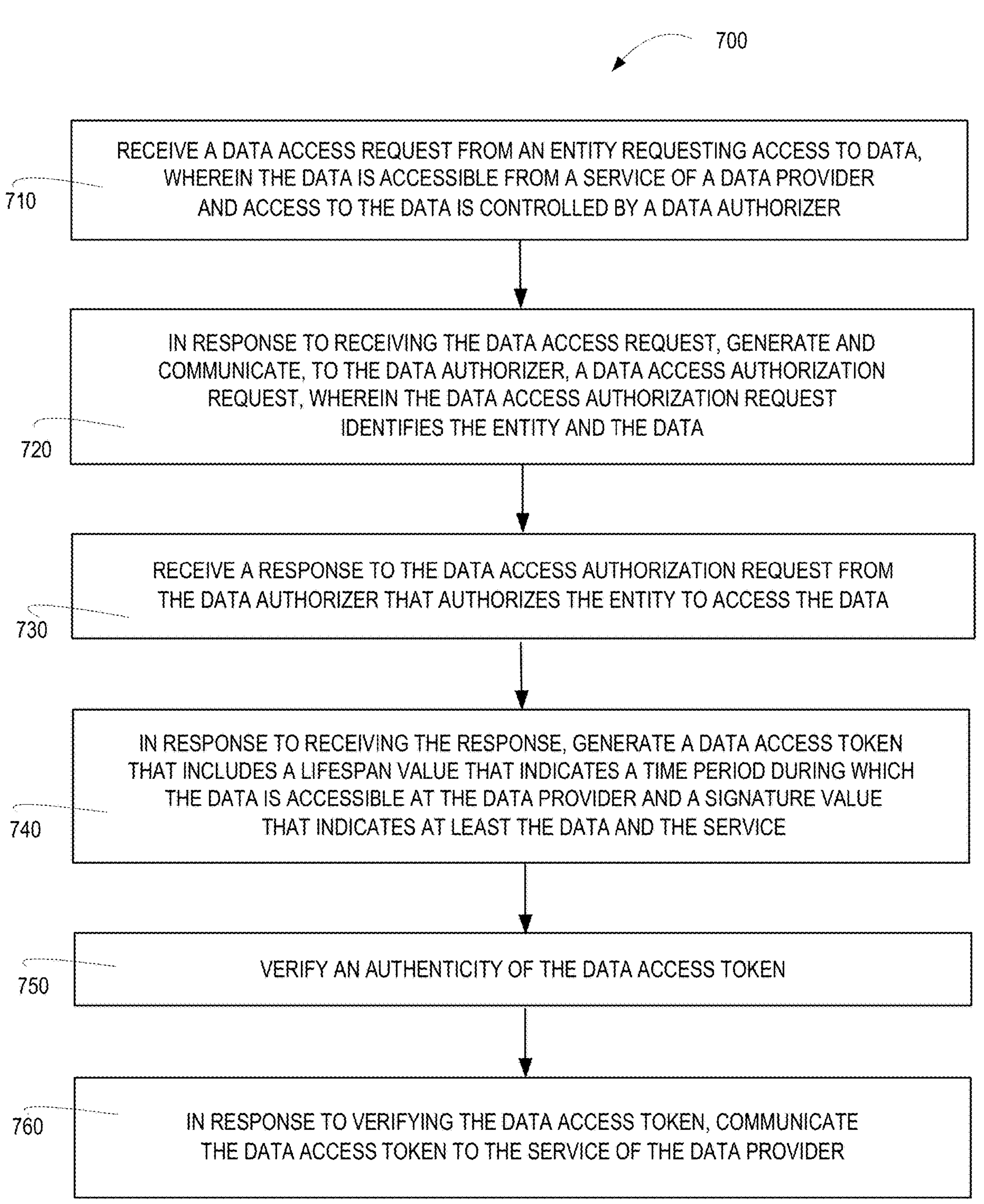

Having thus described embodiments of the disclosure in general terms, reference will now be made to the accompanying drawings, wherein:

FIG. 1 is a schematic/block diagram of system for point-in-time data access authorization, in accordance with embodiments of the present invention;

FIG. 2 is a block diagram of computing platform storing a data access broker, in accordance with embodiments of the present invention;

FIG. 3 is block diagram of a computing platform storing a data access security manager, in accordance with embodiments of the present invention;

FIG. 4 is a swim lane diagram of a method for point-to-point data access authorization and provisioning, in accordance with embodiments of the present; and FIG. 5 is a flow diagram of a method for point-in-time data access authorization, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed that provide for point-in-time data access authorization. The data owner/authorizer provides authorization at the point in time at which a specific data access request is made, without the need for the data owner to share their service-specific access credentials with the third-party entity/data requester. As a result, the data owner has control over the authorization of each data access request and has knowledge as to when data access by the third-party entity is occurring.

Specifically, systems, methods and the like implement a data access broker which is a public Application Programming Interface (API) that receives data requests from third-party entities (i.e., data requestors) requesting access to a data authorizer's (i.e., data owner) data which is stored/held by a data provider. Typically, the requests made by the third-party entities are at the behest of the data authorizer/owner. The data access broker is responsible for verifying the identity of the third-party entity utilizing Secure Socket Layer (SSL) certificates or the like.

Systems, methods and the like additionally include a data access security manager, which is customized API code or the like. In response to the data access broker verifying the identity of the third-party entity, the data access security manager receives the data request from the data access broker. Data access security manager is responsible for obtaining point-in-time data access authorization from the data owner. In this regard, according to specific embodiments, the data access security manager identifies the data owner's chosen means for data access approval communication (e.g., text/SMS, mobile application or the like) and, in response, communicates a data access authorization request to the data owner that identifies the third-party entity and details of the request (e.g., data being requested including type, volume and/or service/source).

In response to the data owner approving the data access authorization, a response is communicated to the data access security manager, which, in response generates a data access token, which serves as the cryptographic signature for data access and includes a lifespan (i.e., time-to-live) value and a unique signature value which is tied to the data system at the data provider housing the data. Once generated, the data access token is communicated to the data access broker for token approval and once approved, the data access broker forwards the data access token to the data providing service/system at the data provider. The data provider validates the data access token with the data access security manager, and once validated, the data provider retrieves the requested data and provides the data to the data access broker, which subsequently forwards the data to the third-party entity/data requestor.

Referring to FIG. 1, a schematic/block diagram is presented of a system 100 for point-in-time data access authorization, in accordance with embodiments of the present invention. The system 100 is implemented within a distributed communication network 110, which may include the Internet, one or more intranets, one or more cellular networks or the like. The system 100 includes a first computing platform 200 having a first memory 202 and one or more first computing processing devices 204 in communication with first memory 202. First memory 202 stores data access broker 210, which is executable by at least one of the one or more first computing processor devices 204. Data access broker 210 is configured to receive data access request 212 from a third-party entities/data requestor 300 requesting access to data 420. The data 420 is accessible from a service/system 410 of a data provider 400 and access to the data 420 is controlled by a data authorizer/owner 600. One of ordinary skill in the art will appreciate that data access broker 210 is configured to receive such data access requests 212 from a plurality of different third-party entities/data requestors 300 requesting access to different data 420 accessible at different services 410 and/or different data providers 400, access to which is controlled by different data authorizers/owners 600.

Data 420 as used herein includes anything digitally accessible that is under the control of the data owner/authorizer 600 including, but not limited to, financial resources. In such embodiments of the invention in which data 420 is financial resources, the data provider 400 may be a financial institution and the services/systems 410 may be specified account types within the financial institution. In such embodiments of the invention, the third-party entity/data requestor, may be (i) a personal financial management system requiring access to a user's financial information for purposes of aggregating a financial management view, (ii) a resource exchange/payment service requiring access to a user account for purposes of funding current or future resource exchanges/payments, or (iii) a financial/lending institution requiring access to user's employer system for purposes of verifying employment/revenue or the like. As such, most data access requests 212 are initiated by the third-party entity/data requestor 300 at the behest of the data authorizer/owner 600.

In specific embodiments of the invention, data access request 212 identifies the third-party entity/data requestor 300, the data owner/authorizer 600, the data 420, including, when appropriate, data type, data amount, data source, the data provider 400 and service 410 including, when appropriate, specific location information (e.g., account number, routing number or the like).

The system 100 additionally includes a second computing platform 500 having a second memory 502 and one or more second computing processing devices 504 in communication with second memory 502. Second memory 502 stores data access security manager 510, which is executable by at least one of the one or more second computing processor devices 504. Data access security manager 510 is configured to receive the data access request 212 from the data access broker 212 and, in response, generate a data access authorization request 512 and initiate communication of the request 512 to the data owner/authorizer 600. The data access authorization request 512 identifies, at a minimum, the third-party entity/data requestor 300, the data 420 and, in some embodiments, the data type, amount, source (i.e., the data provider 400 and/or service/system 410). The request 512 may be configured with user activatable approval and denial keys that allow the data owner/authorizer 600 to authorize or reject the requested data access.

In response to receiving a response to the authorization request 512 that authorizes the third-party entity/data requestor 300 to access the data 420, data access security manager 510 is further configured to generate a data access token 520 (i.e., cryptographic signature) that includes a signature value 530 and a lifespan value 540. The signature value 530 indicates, at least the service 410 and/or data provider 400 and the data 420 and the lifespan value 540 indicates the period of time during which the token 520 is valid (i.e., the time during which the data 420 is accessible at the service 410/data provider 400. In other words, if the lifespan value 540 is exceeded, the token 520 effectively expires and the data 420 is no longer accessible to the third-party entity/data requestor 300.

Once the data access token 520 is generated, data access security manager 510 initiates communication of the data access token 520 to the data access broker 210, which is further configured to perform verification/approval 220 of the data access token 520 prior to initiating communication of the data access token 520 to the data provider 400 for purposes of accessing the data 420 (i.e., retrieving the data 420 and initiation communication of the data 420 to the third-party entity/data requestor 300).

Referring to a FIG. 2, a block diagram is presented of first computing platform 200, in accordance with embodiments of the present invention. In addition to providing greater details of data access broker 210, FIG. 2 highlights various alternate embodiments of the invention. First computing platform 200 may comprise one or multiple devices, such as servers or the like. First computing platform 200 includes first memory 202, which may comprise volatile and/or non-volatile memory, such as read-only and/or random-access memory (RAM and ROM), EPROM, EEPROM, flash cards, or any memory common to computing platforms). Moreover, first memory 202 may comprise cloud storage, such as provided by a cloud storage service and/or a cloud connection service.

Further, first computing platform 200 includes one or more first computing processing devices 204, which may be an application-specific integrated circuit ("ASIC"), or other chipset, logic circuit, or other data processing device. First computing processing device(s) 204 may execute one or more application programming interface (APIs) that interface with any resident programs, such as data access broker 210 or the like, stored in first memory 202 of first computing platform 200 and any external programs. First processing devices(s) 204 may include various processing subsystems (not shown in FIG. 2) embodied in hardware, firmware, software, and combinations thereof, that enable the functionality of first computing platform 200 and the operability of first computing platform 200 on a distributed communication network 110 (shown in FIG. 1), such as the Intranet, intranet(s), cellular network(s) and the like. For example, processing subsystems allow for initiating and maintaining communications and exchanging data with other networked devices. For the disclosed aspects, processing subsystems of first computing platform 200 may include any subsystem used in conjunction with data access broker 210 and related tools, routines, sub-routines, algorithms, sub-algorithms, sub-modules thereof.

In specific embodiments of the present invention, first computing platform 200 additionally includes a communications module (not shown in FIG. 2) embodied in hardware, firmware, software, and combinations thereof, that enables electronic communications between first computing platform 200 and other networks and network devices. Thus, communication module may include the requisite hardware, firmware, software and/or combinations thereof for establishing and maintaining a network communication connection with one or more devices and/or networks.

First memory 202 of first computing platform 200 stores data access broker 210, which may be a public Application Programming Interface (API) or the like. As previously discussed in relation to FIG. 1, data access broker 210 is configured to receive data access requests 212 from third-party entities/data requestors 300 requesting access to data 420 that is accessible at data providers 400 (shown in FIG. 1). As previously discussed, in specific embodiments of the invention, data access request 212 identifies the third-party entity/data requestor 300, the data owner/authorizer 600, the data 420, including, when appropriate, data type, data amount, data source, the data provider 400 and service 410 including, when appropriate, specific location information (e.g., account number, routing number or the like).

In specific embodiments of the invention, in response to receiving data access request 212, data access broker 210 is configured to perform third-party entity/data requestor authentication 230. In specific embodiments of the invention authentication 230 is performed by verifying that third-party entity/data requestor 300 has a valid authentication certificate 232 on file. In such embodiments of the invention, the data access request 212 is only forwarded to the data access security manager 310 (shown in FIG. 1) if the third-party entity/data requestor 300 is successfully authenticated.

In addition, as previously discussed, once the data access security manager 310 (shown in FIG. 1) has generated the data access token 520, the data access token is communicated to the data access broker 210 and the data access broker 210 is configured to perform verification/approval 220 of the digital access token 220 prior to forwarding the data access token on to the service 410 of the data provider 400.

Moreover, data access broker 210 is configured to receive the data 420 from the data provider 400 and prepare the final response message/package 240 prior to communicating the package 240 including the data 420 to the third-party entity/data requestor 300.

Referring to a FIG. 3, a block diagram is presented of second computing platform 500, in accordance with embodiments of the present invention. In addition to providing greater details of data access security manager 510, FIG. 3 highlights various alternate embodiments of the invention. Second computing platform 500 may comprise one or multiple devices, such as servers or the like. Second computing platform 500 includes second memory 502, which may comprise volatile and/or non-volatile memory, such as read-only and/or random-access memory (RAM and ROM), EPROM, EEPROM, flash cards, or any memory common to computing platforms). Moreover, second memory 502 may comprise cloud storage, such as provided by a cloud storage service and/or a cloud connection service.

Further, second computing platform 500 includes one or more second computing processing devices 504, which may be an application-specific integrated circuit ("ASIC"), or other chipset, logic circuit, or other data processing device. Second computing processing device(s) 504 may execute one or more application programming interface (APIs) that interface with any resident programs, such as data access security manager 510 or the like, stored in second memory 502 of second computing platform 500 and any external programs. Second computing processing devices(s) 504 may include various processing subsystems (not shown in FIG. 3) embodied in hardware, firmware, software, and combinations thereof, that enable the functionality of second computing platform 500 and the operability of second computing platform 500 on a distributed communication network 110 (shown in FIG. 1), such as the Intranet, intranet(s), cellular network(s) and the like. For example, processing subsystems allow for initiating and maintaining communications and exchanging data with other networked devices. For the disclosed aspects, processing subsystems of second computing platform 500 may include any subsystem used in conjunction with data access security manager 510 and related tools, routines, sub-routines, algorithms, sub-algorithms, sub-modules thereof.

In specific embodiments of the present invention, second computing platform 500 additionally includes a communications module (not shown in FIG. 3) embodied in hardware, firmware, software, and combinations thereof, that enables electronic communications between second computing platform 500 and other networks and network devices. Thus, communication module may include the requisite hardware, firmware, software and/or combinations thereof for establishing and maintaining a network communication connection with one or more devices and/or networks.

Second memory 502 of second computing platform 500 stores data access security manager 510, which may comprise custom API code or the like. Data access security manager 510 is configured to receive the data access request 212 from the data access broker 212 and, in specific embodiments, in response, log the data access request 212 in data access request log 550. In addition, in response to receiving data access request 212, data access security manager 510 is configured to generate a data access authorization request 512 and initiate communication of the request 512 to the data owner/authorizer 600. In specific embodiments of the invention, prior to initiating communication of the request 512, data access security manager 510 is configured to identify a data owner/authorizer communication channel 560 for communication of the authorization request 512. In specific embodiments data owner/authorizer 600 will have predefined a preferred communication channel for receiving the authorization request 512, such as but not limited to, text/Short Message Service (SMS) 652, mobile application 654 or the like.

As previously discussed, the data access authorization request 512 identifies, at a minimum, the third-party entity/data requestor 300, the data 420 and, in some embodiments, the data type, amount, source (i.e., the data provider 400 and/or service/system 410). The request 512 may be configured with user activatable approval and denial keys that allow the data owner/authorizer 600 to authorize or reject the requested data access. In specific embodiments of the invention, data access authorization request 512 is configured to allow for the data owner/authorizer 600 (shown in FIG. 1) to define the data access lifespan (i.e., the time period during which the data access must occur). In such embodiments of the invention, data access authorization request 512 may be configured with an input field configured to receive a user input of the lifespan or keys/buttons associated with predetermined lifespans (e.g., 30 minutes, one hour, two hours or the like).

Data access security manager 510 is further configured to receive a data access authorization request response 514 from the data owner/authorizer 600, which indicates either approval 516 (i.e., authorization) or denial 518 (i.e., no authorization). In the event that a response 514 is not received in a predetermined period of time, data access security manager 510 may deny authorization or another request 512 may be generated and communicated via the same/preferred communication channel 560 or via the data owner's/authorizer's secondary/back-up communication channel 560 or the like.

In specific embodiments of the invention, the data access authorization requests 512 and data access authorization request responses 514 are logged in data access authorization request/response log 570. Logging of requests 512 and responses 526 prevents against subsequent repudiation claims by the data owner/authorizer 600.

In response to receiving response 514 to the authorization request 512 that indicates approval 518 (i.e., authorization for the third-party entity/data requestor 300 to access the data 420), data access security manager 510 is further configured to generate a data access token 520 (i.e., cryptographic signature) that includes a signature value 530 and a lifespan value 540. The signature value 530 indicates, at least the service 410 and/or data provider 400 and the data 420 including, in some embodiments, data type 422 and data amount 424). The lifespan value 540 indicates the period of time during which the token 520 is valid (i.e., the time during which the data 420 is accessible at the service 410/data provider 400.

Once the data access token 520 has been communicated to the data provider 400, the data provider may communicate a validation request 540 to the data access security manager 510 that request performance of a data access token validation 570 (i.e., asking the data access security manager whether they generated this particular token 520) and, in response to performing the validation 570, generate and initiate communication of a validation response 572 to the data provider 400. In such embodiments of the invention, the data provider 400 must receive a validation response 572 that indicates that the data access token 520 is valid before retrieving the data 420 and initiating communication of the data 420 to the third-party entity/data requestor 300.

Referring to FIG. 4, a swim-lane diagram is depicted that shows the flow for point-in-time data access authorization and data access/retrieval, in accordance with embodiments of the invention. Initially, third-party entity/data requestor 300 generates and communicates a data access request 212 to data access broker 210. In response to receiving the data access request 212, data access broker performs data requestor authentication 230. In specific embodiments of the invention, authentication 230 provides for verifying that the third-party entity/data requestor 300 has valid certificate on file. In response to successfully authenticating the third-party entity/data requestor 300, the data access request 212 is forwarding to the data access security manager 510.

In response to receiving data access request 212, data access security manager 510 performs communication channel identification 566 to identify the data owner's/authorizer's preferred communication channel for receiving authorization requests and, in response, generates and communicates data access authorization request 512 to the data owner/authorizer 600.

In response to receiving data access authorization request response 514 that indicates authorization, data access security manager 510 performs data access token generation 522 to generate data access token 520. Once the token 520 has been generated, the token 520 is communicated to the data access broker 210, which performs data access token verification 220 to ensure that the token 220 is approved for accessing data. In response to successful verification 220, data access broker 210 communicates the data access token 520 to the data provider 400.

In response to receiving the data access token 520, data provider 400 communicates a token validation request 430 to the data access security manager 510, which in turn performs data access token validation 570 (i.e., verifying that the token was generated by the data access security manager 510). In response to validation 570, the data access security manager 510 generates and communicated a validation response 572 to the data provider 400. In response to receiving an affirmative validation response 572, data provider retrieves the data 420 and communicates the data 420 to the data access broker 210. In response to receiving the data 420, data access broker formalizes a final package 240 and communicated the final package 240 including the data 420 to the third-party entity/data requestor 300. Accordingly, the third-party entity/data requestor 300 receives that data 300 without being required to possess/present the data authorizer's/owners user credentials (e.g., username/passcode or the like) for gaining access to the service 410 and/or data provider 400. Moreover, the data authorizer's/owner's data access authorization response 514 does not include the user credentials.

Referring to FIG. 5, a flow diagram is presented of a method 700 for point-in-time data access authorization, in accordance with embodiments of the present invention. At Event 710, a data access request is received from an entity requesting access to data. The data that is being requested is accessible from a service of a data provider and access to the data is controlled by a data authorizer/owner.

In response to receiving the data access request, at Event 720, a data access authorization request is generated and communicating to the data authorizer/owner. The data access authorization request identifies, at least, the entity requesting the data and the data including, in some embodiments, specifics of the data, such as, data type, data volume, data source and the like. At Event 730, an authorization response to the data access authorization request is received from the data authorizer that authorizes the entity to access the data.

In response to receiving the authorization response, at Event 740, a data access token is generated that includes a signature value that indicates at least the data and the service/data provider and a lifespan value that indicates a time period during which the data is accessible at the data provide. At Event 750, an authenticity of the data access token is verified and, in response to verification, at Event 760, the data access token is communicated to the service of the data provider, where, in response, the data is retrieved and communicated to the requesting entity.

Thus, present embodiments of the invention provide point-in-time data access authorization. The data owner/authorize provides authorization at the point in time at which a specific data access request is made, without the need for the data owner to share their service-specific access credentials with the third-party entity/data requester. As a result, the data owner has control over the authorization of each data access request and has knowledge as to when data access by the third-party entity is occurring. Further, by not having to share access credentials with the third-party entity/data requester security issues related to exposure and/or misuse of the access credentials are avoided.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for point-in-time data access authorization, the system comprising:

a first computing platform including a first memory and one or more first computing processor devices in communication with the first memory, wherein the first memory stores a data access broker that is executable by at least one of the one or more first computing processor devices and is configured to:

receive a data access request from an entity requesting access to data, wherein the data is accessible from a service of a data provider and access to the data is controlled by a data authorizer, wherein the data access request comprises a user input field configured to receive a lifespan value that indicates a time period during which the data is accessible at the data provider, and forward the data access request to a data access security manager;

a second computing platform including a second memory and one or more second computing processor devices in communication with the second memory, wherein the second memory stores the data access security manager that is executable by at least one of the one or more first computing processor devices and is configured to:

in response to receiving the data access request, generate and communicate, to the data authorizer, an initial data access authorization request, wherein the initial data access authorization request identifies the entity and the data, wherein communicating further comprises identifying a communication channel preselected by the data authorizer and communicate, over the identified communication channel to the data authorizer, the data access authorization request, in response to not receiving a response to the initial data access authorization request initiated via the identified communication channel in a predetermined period of time, generate and communicate, to the data authorizer, a data access authorization request via a secondary communication channel, wherein the data access authorization request identifies the entity and the data, receive a response to the data access authorization request from the data authorizer that authorizes the entity to access the data, in response to receiving the response, generate and communicate, to the data access broker, a data access token that includes the lifespan value and a signature value that indicates at least the data and the service, wherein, the data access broker is further configured to:

in response to receiving the data access token, verify the data access token, and in response to verifying the data access token, communicate the data access token to the service of the data provider.

2. The system of claim 1, wherein the data access security manager is further configured to:

in response to the service of the data provider receiving the data access token, receive a data access token validation request from the data provider, and validate the data access token by determining that the data access token was generated by the data access security manager, and in response to validation, generate and communicate a response, to the validation data access token validation request, that indicates that the data access token is valid.

3. The system of claim 1, wherein the data access security manager is further configured to generate the data access token that includes the signature value, wherein the signature value further indicates at least one of (i) a volume of the data that is accessible to the entity and (ii) a type of the data that is accessible to the entity.

4. The system of claim 1, wherein the data access broker is further configured to:

in response to the service of the data provider receiving the data access token and collecting the data, receive, from the data provider, the requested data and forward the requested data to the entity.

5. The system of claim 1, wherein the data access broker is further configured to:

in response to receiving the data access request, verify an identity of the entity prior to forwarding the data access request to the data access security manager.

6. The system of claim 1, wherein the entity is provided access to the data without the data authorizer providing, to the entity, service access credentials associated with the data authorizer.

7. The system of claim 1, wherein the entity is provided access to the data without the data authorizer providing, in the response to the data access authorization request, service access credentials associated with the data authorizer.

8. A computer-implemented method for point-in-time data access authorization, the method executed by one or more computing processor devices and comprising:

receiving a data access request from an entity requesting access to data, wherein the data is accessible from a service of a data provider and access to the data is controlled by a data authorizer, wherein the data access request comprises a user input field configured to receive a lifespan value that indicates a time period during which the data is accessible at the data provider;

in response to receiving the data access request, generating and communicating, to the data authorizer, an initial data access authorization request, wherein the initial data access authorization request identifies the entity and the data, wherein communicating further comprises identifying a communication channel preselected by the data authorizer and communicate, over the identified communication channel to the data authorizer, the data access authorization request;

in response to not receiving a response to the initial data access authorization request initiated via the identified communication channel in a predetermined period of time, generating and communicating, to the data authorizer, a data access authorization request via a secondary communication channel, wherein the data access authorization request identifies the entity and the data;

receiving a response to the data access authorization request from the data authorizer that authorizes the entity to access the data;

in response to receiving the response, generate and communicate, to the data access broker, a data access token that includes the lifespan value and a signature value that indicates at least the data and the service, verifying an authenticity of the data access token; and in response to verifying the data access token, communicating the data access token to the service of the data provider, wherein in response to the service receiving the data access token, the service retrieves the data and initiates communication of the data to the entity.

9. The computer-implemented method of claim 8, further comprising:

in response to the service receiving the data access token, validating the data access token by determining that the data access token was generated by the data access security manager.

10. The computer-implemented method of claim 8, wherein generating the data access token further comprises generating the data access token that includes the signature value, wherein the signature value further indicates at least one of (i) a volume of the data that is accessible to the entity and (ii) a type of the data that is accessible to the entity.

11. The computer-implemented method of claim 8, further comprising:

in response to receiving the data access request, verifying an identity of the entity prior to generating and communicating the data access authorization request.

12. The computer-implemented method of claim 8, wherein the entity is provided access to the data without the data authorizer providing, to the entity, service access credentials associated with the data authorizer.

13. A computer program product comprising:

a non-transitory computer-readable medium comprising sets of codes for causing one or more computing processing devices to:

receive a data access request from an entity requesting access to data, wherein the data is accessible from a service of a data provider and access to the data is controlled by a data authorizer, wherein the data access request comprises a user input field configured to receive a lifespan value that indicates a time period during which the data is accessible at the data provider;

in response to receiving the data access request, generate and communicate, to the data authorizer, an initial data access authorization request, wherein the initial data access authorization request identifies the entity and the data, wherein communicating further comprises identifying a communication channel preselected by the data authorizer and communicate, over the identified communication channel to the data authorizer, the data access authorization request;

in response to not receiving a response to the initial data access authorization request initiated via the identified communication channel in a predetermined period of time, generate and communicate, to the data authorizer, a data access authorization request via a secondary communication channel, wherein the data access authorization request identifies the entity and the data;

receive a response to the data access authorization request from the data authorizer that authorizes the entity to access the data;

in response to receiving the response, generate and communicate, to the data access broker, a data access token that includes the lifespan value and a signature value that indicates at least the data and the service, verify an authenticity of the data access token; and in response to verifying the data access token, communicate the data access token to the service of the data provider, wherein in response to the service receiving the data access token, the service retrieves the data and initiates communication of the data to the entity.

14. The computer program product of claim 13, wherein the sets of codes further comprise a set of codes for causing the one or more computing processor devices to, in response to the service receiving the data access token, validate the data access token by determining that the data access token was generated by the data access security manager.

15. The computer program product of claim 13, wherein the set of codes for causing the one or more computing processor devices to generate the data access token further cause the one or more computing processor devices to generate the data access token that includes the signature value, wherein the signature value further indicates at least one of (i) a volume of the data that is accessible to the entity and (ii) a type of the data that is accessible to the entity.

16. The computer program product of claim 13, wherein the sets of codes further comprise a set of codes for causing the one or more computing processor devices to, in response to receiving the data access request, verify an identity of the entity prior to generating and communicating the data access authorization request.

17. The computer program product of claim 13, wherein sets of codes further cause the one or more computing processors to provide the entity access to the data without the data authorizer providing, to the entity, service access credentials associated with the data authorizer.

* * * * *